US012398022B2

(12) United States Patent
Förander et al.

(10) Patent No.: US 12,398,022 B2
(45) Date of Patent: Aug. 26, 2025

(54) SPREADER, CONTAINER HANDLING EQUIPMENT COMPRISING SPREADER, AND METHOD OF LIFTING A TRANSPORT CONTAINER

(71) Applicant: ELME SPREADER AB, Älmhult (SE)

(72) Inventors: Erik Förander, Virestad (SE); Örjan Karlsson, Lund (SE)

(73) Assignee: ELME SPREADER AB, Almhult (SE)

( * ) Notice: Subject to any disclaimer, the term of this patent is extended or adjusted under 35 U.S.C. 154(b) by 305 days.

(21) Appl. No.: 17/913,590

(22) PCT Filed: Mar. 25, 2021

(86) PCT No.: PCT/SE2021/050260
§ 371 (c)(1),
(2) Date: Sep. 22, 2022

(87) PCT Pub. No.: WO2021/201746
PCT Pub. Date: Oct. 7, 2021

(65) Prior Publication Data
US 2023/0373758 A1 Nov. 23, 2023

(30) Foreign Application Priority Data
Mar. 30, 2020 (SE) .................................... 2050351-2

(51) Int. Cl.
*B66C 13/06* (2006.01)
*B66C 1/10* (2006.01)
(Continued)

(52) U.S. Cl.
CPC ............ *B66C 1/101* (2013.01); *B66C 13/063* (2013.01); *B66C 13/46* (2013.01); *B66C 23/88* (2013.01)

(58) Field of Classification Search
CPC ................................ B66C 23/88; B66C 13/46
See application file for complete search history.

(56) References Cited

U.S. PATENT DOCUMENTS 4,017,110 A 4/1977 Pease et al.
4,350,254 A * 9/1982 Noly ....................... B66C 1/101 294/81.4
(Continued)

FOREIGN PATENT DOCUMENTS

JP 5421381 U 2/1979
JP 02300091 A * 12/1990
(Continued)

OTHER PUBLICATIONS

International Search Report and Written Opinion from International Application No. PCT/SE2021/050260 mailed May 18, 2021, all enclosed pages cited.

*Primary Examiner* — Gerald McClain
(74) *Attorney, Agent, or Firm* — Burr & Forman

(57) ABSTRACT

A spreader for lifting a transport container comprises a main frame (26) suspended in a main frame suspension arrangement (36) to enable translation along a longitudinal axis (L). The main frame (26) is vertically supported by the main frame suspension arrangement (36) along a support line extending between a first support end (**68*a*) and a second support end (68*b*), and the main frame suspension arrangement (36) carries the weight of a suspension arrangement load comprising the main frame (26), container connector arrangements (28*a*, 28*b*), and any container(s) attached to the container connector arrangements (28*a*, 28*b***). A detector arrangement is configured to detect if a centre of mass of the suspension arrangement load is positioned at a longitudinal position along the support line which is beyond a limit position.

23 Claims, 8 Drawing Sheets

(51) Int. Cl.
*B66C 13/46* (2006.01)
*B66C 23/88* (2006.01)

(56) References Cited

U.S. PATENT DOCUMENTS

| | | | | |
|---|---|---|---|---|
| 8,925,987 | B1 | 1/2015 | Cody | |
| 2008/0131248 | A1* | 6/2008 | Friz | B66C 13/04 414/561 |
| 2010/0084201 | A1* | 4/2010 | Wurst | B66C 13/16 177/147 |
| 2019/0077638 | A1* | 3/2019 | Karlsson | B66C 1/66 |
| 2019/0202671 | A1 | 7/2019 | Ono | |
| 2019/0375615 | A1* | 12/2019 | Markwell | B66C 1/10 |
| 2021/0087024 | A1* | 3/2021 | Förander | B66C 1/101 |
| 2022/0281719 | A1* | 9/2022 | Morissette | B66C 1/447 |
| 2023/0116088 | A1* | 4/2023 | Josin | B66C 1/101 414/815 |

FOREIGN PATENT DOCUMENTS

| | | | | |
|---|---|---|---|---|
| JP | 0687593 | A | | 3/1994 |
| JP | 2001302170 | A | * | 10/2001 |
| JP | 2009274779 | A | * | 11/2009 |
| WO | 2005094296 | A2 | | 10/2005 |
| WO | 2012174753 | A1 | | 12/2012 |
| WO | 2014064966 | A1 | | 5/2014 |
| WO | 2017007613 | A1 | | 1/2017 |
| WO | 2017135851 | A1 | | 8/2017 |
| WO | 2018090104 | A1 | | 5/2018 |
| WO | 2020055249 | A1 | | 3/2020 |

* cited by examiner

SPREADER, CONTAINER HANDLING EQUIPMENT COMPRISING SPREADER, AND METHOD OF LIFTING A TRANSPORT CONTAINER

FIELD OF THE INVENTION

The present invention relates to a spreader for lifting a transport container, to container handling equipment comprising such a spreader, and to a method of lifting a transport container using a spreader.

BACKGROUND

An intermodal transport container is a standardized shipping container which can be used across and transferred between different modes of transport, such as rail, truck and ship, without unloading and reloading the cargo inside the container. Containers and other types of rigid load carriers of different standard dimensions are normally handled with the aid of a container spreader or yoke, which may typically be carried by a truck or a crane. The spreader attaches to a container at lifting castings, which are often called corner castings as they are typically arranged in all corners of a standard 20- or 40-foot container. For the purpose, the spreader is provided with a plurality of twist-locks or other container connector arrangements, which are known in the art. Often, the spreader is telescopic so as to allow changing the distance between container connector arrangements along a longitudinal axis of the container, in order to accommodate for containers of different standard lengths. Standards for intermodal containers are specified by the International Organization for Standardization, ISO, e.g. in the standards ISO 668:2013 and ISO 1496-1:2013.

WO2017135851A1 discloses a top-lift spreader for handling intermodal transport containers.

Often, the operator of a transport container crane, or the driver of a reach stacker, is positioned far from the spreader, and containers and other objects may impair visibility. Intermodal containers are heavy, and careless handling of such containers may be dangerous. Moreover, spreaders are exposed to wear and need to be regularly maintained.

SUMMARY

It is an object of the present invention to solve, or at least mitigate, parts or all of the above mentioned problems. To this end, there is provided a spreader for lifting a transport container, the spreader comprising a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container; and a main frame suspension arrangement, wherein the main frame is translatably suspended in said main frame suspension arrangement to enable translation along said longitudinal axis, wherein the main frame is configured to be vertically supported by the main frame suspension arrangement along a support line extending between a first support end and a second support end of the main frame suspension arrangement, the main frame suspension arrangement carrying the weight of a suspension arrangement load comprising the main frame, the container connector arrangements, and any container(s) attached to the container connector arrangements, the spreader further comprising a detector arrangement configured to detect if a centre of mass of the suspension arrangement load is positioned at a longitudinal position along the support line which is beyond a limit position. Thereby, containers having a longitudinally eccentric load, i.e. containers having a centre of gravity which is not at a longitudinal position at the container's geometric centre along the longitudinal axis, may be identified and dealt with accordingly, which reduces the risk of accidents and excessive wear of the container spreader. By way of example, eccentrically loaded containers may be sorted out from further handling, or be reloaded in a more balanced manner. Moreover, detecting an eccentricity of the entire suspension arrangement load, including all parts carried by the main frame suspension arrangement, enables compensating for the eccentricity in an accurate manner at the interface between the main frame and the main frame suspension arrangement. The spreader may be a top lift spreader configured to connect from above to four lifting castings, arranged in a rectangular pattern, of the container to be lifted. Alternatively, the spreader may be a side lift spreader configured to attach only to lifting castings of one single vertical side face of the container. According to embodiments, the transport container may be an intermodal transport container provided with lifting castings at the corners, such as a transport container pursuant to any of the standards ISO 668:2013 and ISO 1496-1:2013. Each of said container connector arrangements may comprise at least one respective lifting casting connector configured to engage with a lifting casting of an intermodal transport container. Alternatively or additionally, the container connector arrangements may comprise grapple arms for gripping a bottom face of the container; in such an embodiment, the container does not need any lifting castings at the corners.

According to embodiments, said limit position is at a distance from a longitudinal centre of the main frame. By way of example, the limit position may be at a distance of e.g. more than 200 mm from the longitudinal centre of the main frame, or at a distance of e.g. more than 400 mm from the longitudinal centre of the main frame.

According to embodiments, a support end may be said limit position. Thereby, the risk of accidental translation of an exceedingly eccentric load may be reduced without unduly limiting the set of permissible actions of the spreader. This in an efficient way reduces wear of any portions of the main frame and the main frame suspension arrangement which are not designed and adapted to participate in any engagement with each other, for example by not being provided with friction reducing arrangements such as rollers or slide pads.

According to embodiments, the detector arrangement may be configured to detect if said centre of mass is positioned at a longitudinal position beyond any of said support ends. Such an arrangement even further reduces the risk of accidental translation of an exceedingly eccentric load.

According to embodiments, the detector arrangement may be configured to determine whether said centre of mass is positioned beyond said first support end or beyond said second support end. Such information may be useful e.g. for feedback to an operator or to a control system, for repositioning of the main frame along the main frame suspension arrangement before a new lift is attempted.

According to embodiments, the detector arrangement may be configured to detect a change in an angle formed between the main frame and the main frame suspension arrangement.

According to embodiments, the detector arrangement may be configured to detect if the centre of mass of the suspension arrangement load is positioned at a longitudinal position along the support line which is beyond a limit position based on a displacement of at least a portion of the main frame in relation to the main frame suspension arrangement. The displacement may be a vertical displacement.

According to embodiments, the detector arrangement may be configured to detect that said centre of mass is beyond the second support end based on a vertical displacement of the main frame relative to the main frame suspension arrangement at the first support end. The vertical displacement may be detected along the support line, for example at or adjacent to the position of the second support end, or at any other suitable position along the length of the spreader. The vertical displacement may be detected by a presence sensor, for example an inductive sensor, attached to one of the main frame and the main frame suspension arrangement, and configured to detect the presence of the other of the main frame and the main frame suspension arrangement.

According to embodiments, the detector arrangement may comprise a first sensor adjacent to the first support end, the first sensor being configured to detect said vertical displacement of the main frame relative to the main frame suspension arrangement at the first support end. Such a detection arrangement is inexpensive and reliable. Said first sensor may be a presence sensor attached to one of the main frame and the main frame suspension arrangement, and configured to detect the presence of the other of the main frame and the main frame suspension arrangement. According to an example, the first sensor may be an inductive sensor.

According to embodiments, the detector arrangement may be configured to detect that said centre of mass is beyond the first support end based on a vertical displacement of the main frame relative to the main frame suspension arrangement at the second support end.

According to embodiments, the detector arrangement may comprise a second sensor adjacent to the second support end, the second sensor being configured to detect said vertical displacement of the main frame relative to the main frame suspension arrangement at the second support end. Said second sensor may be a presence sensor attached to one of the main frame and the main frame suspension arrangement, and configured to detect the presence of the other of the main frame and the main frame suspension arrangement. According to an example, the second sensor may be an inductive sensor.

According to embodiments, the detector arrangement may be configured to detect a vertical displacement of the main frame relative to the main frame suspension arrangement at least at two longitudinally separated positions. Such a detector arrangement permits detecting if the main frame pivots relative to the main frame suspension arrangement, as well as the pivoting direction. Moreover, it permits detecting if the entire main frame is moved upwards relative to the main frame suspension arrangement. This may occur if the spreader is lowered until the main frame rests upon a container. When such a situation is detected, the detection arrangement may generate a signal to an operator or a control system to stop lowering the spreader, or to limit the lowering speed. The detector arrangement may comprise first and second sensors as defined hereinabove.

According to embodiments, the main frame suspension arrangement may be configured to permit a vertical play of the main frame, at the first support end and the second support end, of less than 300 mm. Typically, a vertical play of more than 2 mm may be preferred to ease manufacturing tolerances. According to further embodiments, the vertical play may be between 10 mm and 120 mm.

According to embodiments, a downwards-facing surface of the main frame may slidably rest on an upwards-facing surface of the main frame suspension arrangement to enable a longitudinal translation between the main frame and the main frame suspension arrangement. The downwards-facing surface of the main frame and the upwards-facing surface of the main frame suspension arrangement may be horizontal surfaces. As an example of an alternative configuration, the spreader may be configured as a gantry hang spreader, wherein the main frame would hang from the main frame suspension arrangement via a plurality of vertical links, which are pivotally connected to the main frame as well as the main frame suspension arrangement. The vertical links may be configured as hang bars, which may be side-shifted in any other suitable manner. The hang bars may optionally may be configured as hydraulic cylinders, thereby also enabling adjusting a tilt of the container.

According to embodiments, the main frame may comprise a pair of opposite outer side wall faces, each outer side wall face provided with a respective side-shift rail protruding therefrom and extending along said longitudinal axis, each side-shift rail resting on a respective vertical support of said main frame suspension arrangement so as to allow moving the main frame on said vertical supports along said longitudinal axis. Such an arrangement is simple and reliable. Optionally, the main frame may be guided along said longitudinal axis by a pair of side supports facing the respective outer side wall faces.

According to embodiments, the support line may be defined by a slide pad arrangement comprising at least one slide pad.

According to embodiments, the first container connector arrangement may comprise a first travelling beam, and the second container connector arrangement may comprises a second travelling beam, wherein a proximal end of the first travelling beam is guided in the main frame to be telescopically extendable from the main frame in a first direction along said longitudinal axis, and a distal end of the first travelling beam is configured to engage with a first end of said transport container, and wherein a proximal end of the second travelling beam is guided in the main frame to be telescopically extendable from the main frame in a second direction along said longitudinal axis, and a distal end of the second travelling beam is configured to engage with a second end of said transport container. Thereby, the longitudinal distance between the distal ends of the first and second container connector arrangements may be changed, to accommodate for transport containers of different lengths. By way of example, containers often have a standard length of 20 feet or 40 feet, and the first and second container connector arrangements may be telescopically extendable to allow connecting to any of those lengths. Optionally, the main frame may comprise a first travelling beam guide which guides the first travelling beam along the longitudinal axis, and adjacent to said first travelling beam guide, a second travelling beam guide which guides the second travelling beam along the longitudinal axis. Alternatively, the travelling beams may be guided one inside the other.

According to embodiments, each of said first and second container connector arrangements may comprise a respective transversal beam extending in a direction transversal to the longitudinal axis, which transversal direction may be substantially perpendicular to said longitudinal axis, each of said transversal beams being provided with two respective lifting casting connectors separated along said transversal direction, for connecting to two lifting castings of said transport container. Typically, the two lifting casting connectors of a transversal beam connect to two respective short-side lifting castings of the container, such that the two container connector arrangements connect to lifting castings of all four corners of a rectangular face of the transport container.

According to embodiments, the detector arrangement may be configured to generate, based on said detection, an electronic indication signal to a control system or an operator of the spreader. The electronic indication signal may e.g. light a warning lamp if an eccentric load is detected, and/or indicate to the operator or control system a direction in which the spreader should be side-shifted before continuing a lift, and/or apply a control constraint to a control system with regard to what manoeuvres are permitted for the spreader or any equipment to which the spreader is operatively connected. Such a control constraint may e.g. be limitation of a maximum lifting force, prevention of lifting the container, and/or prevention of side-shift, i.e. translation along the longitudinal axis of the main frame relative to the main frame suspension arrangement. The signal may also be used for sorting out the container for reloading, and/or tagging the container within a container logistics database as non-compliant with load eccentricity requirements. The control system may be arranged in the spreader, in any container handling equipment carrying the spreader, or both. The control system may comprise analogue and/or digital electronics specifically designed for operating the container handling equipment and/or spreader, such as application specific integrated circuitry, and/or general-purpose processing circuitry provided with computer program instructions configured to operate the container handling equipment and/or spreader accordingly.

According to embodiments, the detector arrangement may comprise at least one actuator for powered pile slope, wherein the detection is based on a detected load on said at least one actuator. The term "pile slope" refers to changing the sideways leaning of the container, i.e. the trim. Optionally, the at least one actuator comprises two or more longitudinally separated actuators, wherein the detection is based on a detected load on said two or more actuators. The actuator(s) may be hydraulic cylinder(s); thereby, the load may be detected by detecting a hydraulic pressure in the respective hydraulic cylinder(s). The load on the actuator(s) may be combined with a determined weight of the container and a determined side-shift position, for determining a position of the centre of mass of the container in isolation.

The spreader may further comprise a crane connection interface comprising a crane bracket, the crane connection interface enabling the spreader to be rigidly connected to a crane arm or boom of e.g. a vehicle. The crane connection interface may further comprise one or more actuators, such as one or more hydraulic cylinders, such that the rigid connection between the crane arm and the spreader defines a rigidly controllable joint.

According to a second aspect, parts or all of the above mentioned problems are solved, or at least mitigated, by a container handling equipment comprising a spreader as defined hereinabove, the container handling equipment comprising a control system configured to, based on said detection, impose a control constraint limiting a set of permissible operations of the container handling equipment. The control system may be a control system of the spreader as such, and/or of e.g. a truck carrying the spreader; the control constraint may e.g. be any of those defined above. According to an embodiment, a spreader comprising a control system may in itself constitute a container handling equipment as defined above.

According to an embodiment, the spreader may comprise a rotator configured to rotate the main frame about a substantially vertical rotation axis perpendicular to the longitudinal axis, wherein said control system is configured to, based on a detected position of said centre of mass, brake or block a rotation of the main frame via said rotator, and/or impose a control constraint limiting a possibility to tilt the rotator about an axis parallel to the longitudinal axis. If the load is eccentric, a tilt of the rotator axis may cause the load to uncontrollably rotate in the rotator. This may be avoided by blocking the rotator or preventing tilt of the rotator. Tilt may be limited by e.g. imposing control constraints to the actuation of a tilt joint, and/or by constraining any power damping arrangement otherwise permitting movement of the main frame in the tilt direction.

According to a third aspect, parts or all of the above mentioned problems are solved, or at least mitigated, by a method of lifting a transport container using a spreader, the method comprising positioning a main frame at a longitudinal position along a main frame suspension arrangement; attaching container connector arrangements of the spreader at two longitudinal ends of said container; initiating a lift of said container by lifting said spreader; and detecting whether a longitudinal position of a centre of mass of a load carried by the main frame suspension arrangement is beyond a limit position. The method may be performed using a spreader or container handling equipment as defined above.

According to a fourth aspect, parts or all of the above mentioned problems are solved, or at least mitigated, by a method of lifting a transport container using a spreader comprising a main frame carried by a main frame suspension arrangement, the method comprising attaching container connector arrangements, carried by the main frame, at two longitudinal ends of said container; initiating a lift of said container by lifting said spreader; detecting a longitudinal eccentricity of a centre of mass of the container; and, based on the detected eccentricity, moving the centre of mass of the container sideways, towards a longitudinal centre of the main frame suspension arrangement, by moving the main frame sideways. The method may be performed using a spreader or container handling equipment as defined above. Alternatively or additionally, the container load eccentricity may be detected by measuring the vertical loads on container connector arrangements connected to the respective longitudinal ends of the container.

According to a fifth aspect, parts or all of the above mentioned problems are solved, or at least mitigated, by a spreader for lifting a transport container, the spreader comprising a main frame having a first end and a second end, and extending along a longitudinal axis between said first end and said second end, the first end being provided with a first container connector arrangement and the second end being provided with a second container connector arrangement, each of said first and second container connector arrangements comprising at least one respective lifting casting connector configured to engage with a lifting casting of a transport container; and a main frame suspension arrangement, wherein the main frame is translatably suspended in said main frame suspension arrangement to enable translation along said longitudinal axis, wherein the main frame is configured to be vertically supported by the main frame suspension arrangement along a support line extending between a first support end and a second support end, such that the main frame carries the weight of a suspension arrangement load comprising the main frame, the container connector arrangements, and any container(s) attached to the container connector arrangements, the spreader further comprising a detector arrangement configured to detect a vertical displacement of the main frame relative to the main frame suspension arrangement at least at two longitudinally separated positions. Such a detector arrangement allows detecting when the spreader has landed on a container. An output signal from the detector arrangement may be used for applying restrictions in a control system operatively connected to the spreader, the restrictions limiting continued lowering of the spreader. The spreader may be configured in accordance with any of the above embodiments.

According to a sixth aspect, parts or all of the above mentioned problems are solved, or at least mitigated, by a method of lifting a transport container using a spreader comprising a main frame extending along a longitudinal axis, the main frame being suspended in a main frame suspension arrangement, the method comprising: lowering the spreader onto the container; and detecting a vertical displacement of the main frame relative to the main frame suspension arrangement at least at two longitudinally separated positions. Such detection may provide valuable guidance to an operator or a control system with regard to when and to what extent the spreader has been seated onto a container. The method may be performed using a spreader as defined above.

It is noted that embodiments of the invention may be embodied by all possible combinations of features recited in the claims or defined above. Further, it will be appreciated that the various embodiments described for the spreaders and container handling equipment of the first, second and fifth aspects are all combinable with the methods as defined in accordance with the third, fourth and sixth aspects of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
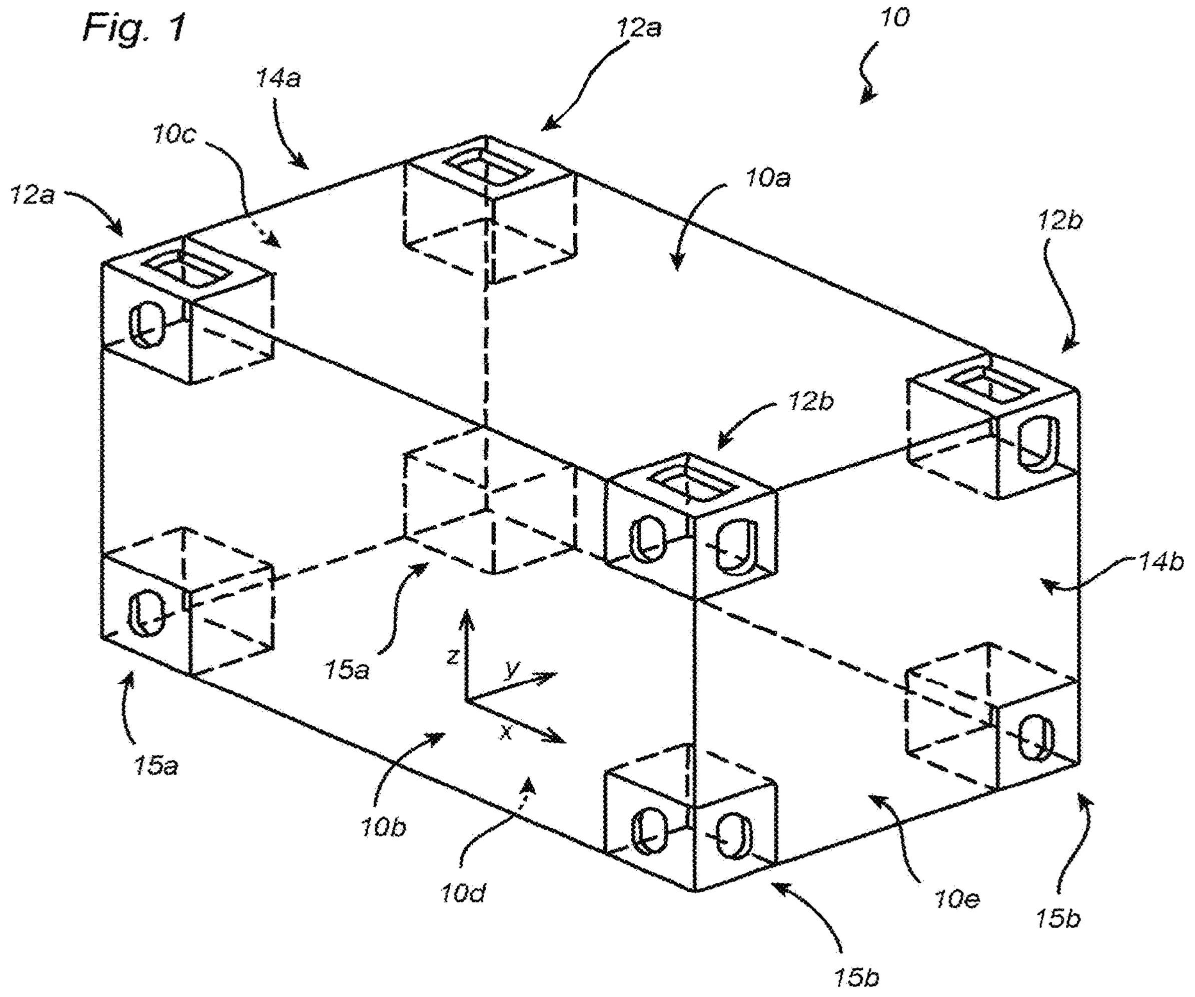
FIG. 1 is an illustration in perspective of an intermodal transport container.

FIG. 1 schematically illustrates an intermodal container 10 according to the above-mentioned ISO standards. The container 10, which for clarity is illustrated transparent, has a top face 10*a*, a first longitudinal side 10*b*, and a first short side or gable side 10*c*. The container also has a bottom face 10*d*, a second longitudinal side, and a second gable side 10*e*, which are located parallel and opposite the top face 10*a*, first longitudinal side 10*b*, and first gable side 10*c*, respectively. Each corner of the container 10 is provided with a respective lifting casting for attaching a respective lifting casting connector, for the purpose of facilitating the handling of the container 10, and for locking the container 10 to other containers or to the deck of a freight ship. Hence, the container top corners which define the corners of the top face 10*a* are provided with two lifting castings 12*a* at a first longitudinal end 14*a* of the container 10, and two lifting castings 12*b* at a second longitudinal end 14*b* of the container 10. Similarly, the container bottom corners are provided with four bottom lifting castings 15*a*, 15*b* at the four corners of the bottom face.

FIG. 1 also illustrates the container 10 arranged in a cartesian coordinate system, wherein the bottom face 10*d* of the container 10 is in the x-y plane, the longitudinal sides 10*b* of the container 10 are arranged along the x-z plane, and the gable sides 10*c*, 10*e* of the container 10 are arranged along the y-z plane. The rotation directions of a container 10 are typically given by reference to the directions of rotation of a container arranged on a cargo ship. Containers 10 arranged on a cargo ship are aligned with the cargo ship having the longitudinal sides 10*b* along the length of the cargo ship. The rotational motions of the container may therefore be defined by reference to the motions of the cargo ship, i.e. list, trim and skew. List is rotation about the x-axis, and is sometimes also referred to as tilt. Trim is rotation about the y-axis; herein, trim may also be referred to as sideways leaning of the container 10. Skew is rotation about the z-axis.

Figure 2:
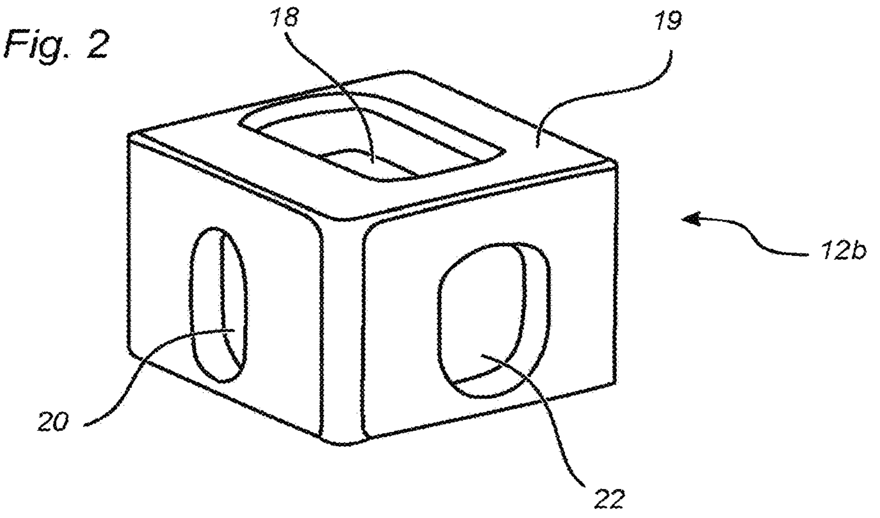
FIG. 2 is an illustration in perspective of a top lifting casting of the intermodal transport container of FIG. 1.

FIG. 2 illustrates one of the top lifting castings 12*b* in greater detail, in the same perspective as that of FIG. 1. It is provided with a top face lock opening 18, a longitudinal side lock opening 20, and a gable lock opening 22, each of which is configured to receive and engage with a male insert of a lifting casting connector, such as a lifting hook or a twist-lock. It will be appreciated that all top lifting castings 12*a*, 12*b* may be identical, albeit in a mirror configuration.

Figure 3:
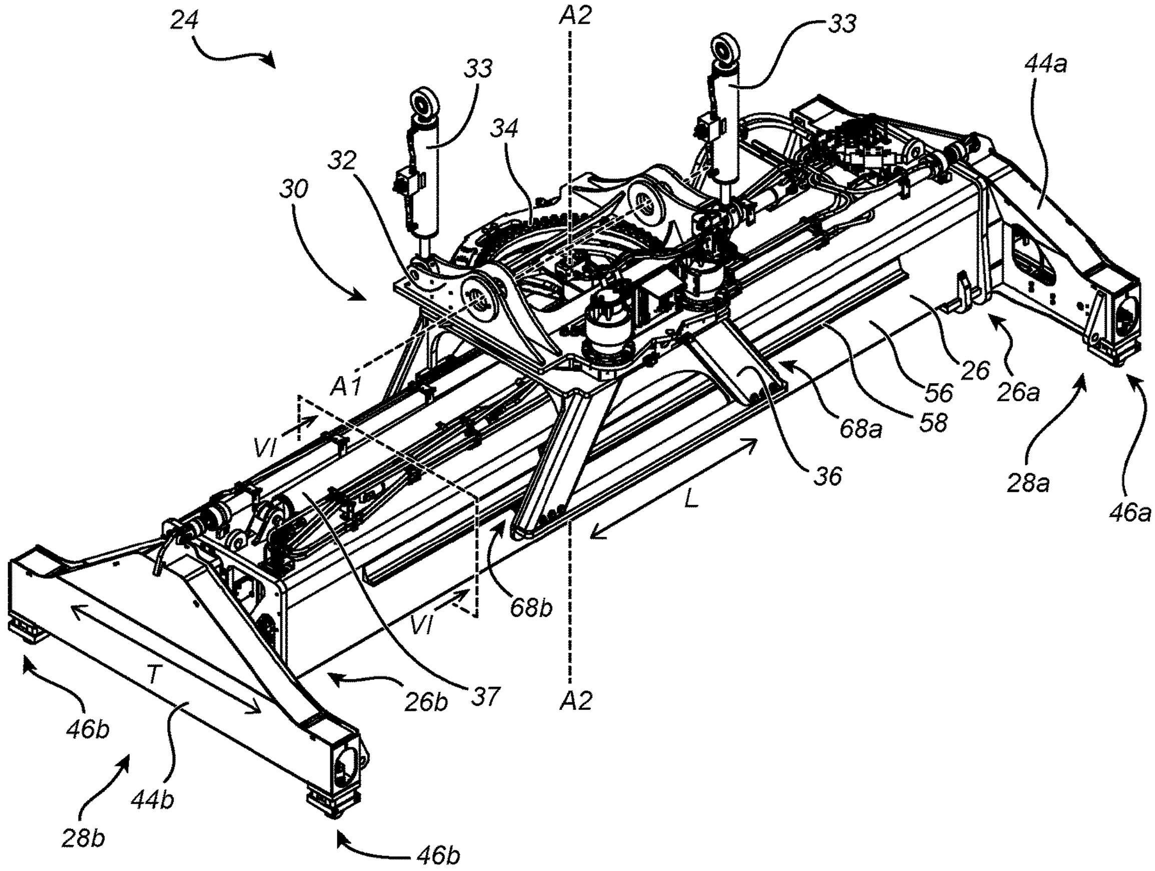
FIG. 3 is an orthographic projection of a spreader according to a first embodiment.

FIG. 3 illustrates a top-lift spreader 24 for handling an intermodal transport container according to the above-mentioned ISO standards. The spreader 24 comprises a main frame 26 extending along a longitudinal axis L between a first end 26*a* and a second end 26*b*. The first end 26*a* carries a first container connector arrangement 28*a* configured to be connected to the first end 14*a* of the container (FIG. 1), and the second end 26*b* carries a second container connector arrangement 28*b* configured to be connected to the second end 14*b* of the container (FIG. 1).

The spreader 24 further comprises a main frame carrier 30 comprising a crane bracket 32, which is configured to be connected to a crane (not illustrated) such as a telescopic boom crane or a wire crane. The crane bracket 32 is connectable to the crane to enable tilting the container about a horizontal pivot axis A1, extending along the longitudinal axis L, for changing the tilt of the container 10 (FIG. 1). For the purpose, a pair of hydraulic tilt cylinders 33 are likewise connectable to the crane. The main frame carrier 30 further comprises a rotator 34 enabling rotation of the main frame 26, and thereby any container(s) 10 held by the spreader 24, in relation to the crane bracket 32 about a substantially vertical rotation axis A2 for changing the skew of the container. The main frame carrier 30 also comprises a main frame suspension arrangement 36 enabling translation of the main frame 26 relative to the main frame carrier 30 along the longitudinal axis L. The main frame suspension arrangement 36 thereby carries the weight of a suspension arrangement load comprising the main frame 26, the container connector arrangements 28*a*, 28*b*, and any container(s) 10 attached to the container connector arrangements 28*a*, 28*b*. A side-shift mechanism 37, configured as a hydraulic cylinder extending along the main frame 26, is connected to the main frame 26 as well as to the main frame suspension arrangement 36. The side-shift mechanism 37 enables moving the main frame 26 relative to the main frame suspension arrangement 36 along the longitudinal axis L. The side-shift mechanism 37 also comprises a side-shift sensor (not illustrated) enabling determining the mutual positional relationship between the main frame suspension arrangement 36 and the main frame 26. The side-shift sensor may be arranged within the hydraulic cylinder as such, or be provided as a separate sensor.

Figure 4A:
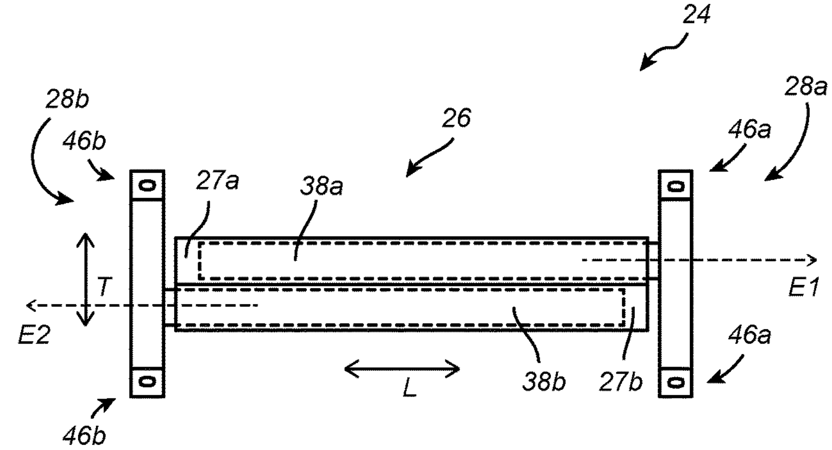
FIG. 4A is a schematic illustration of the spreader of FIG. 3 as seen from below, when in a longitudinally retracted position.
Figure 4B:
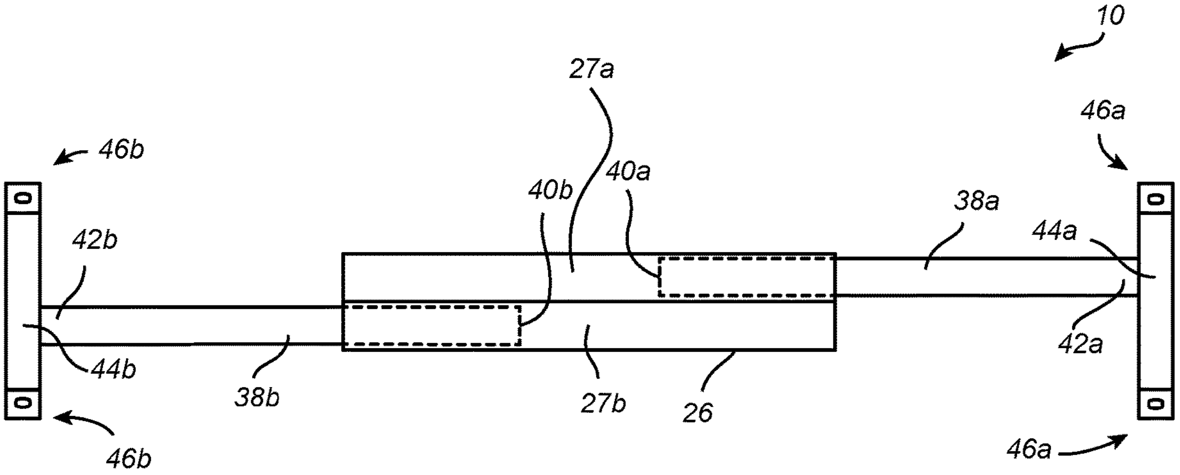
FIG. 4B is a schematic illustration of the spreader of FIG. 3 as seen from below, when in a longitudinally extended position.

FIGS. 4A and 4B illustrate the spreader 24 in a highly schematic manner, and as seen from below. The first container connector arrangement 28*a* comprises a first travelling beam 38*a* guided in first travelling beam guide configured as a sleeve 27*a* within the main frame 26. Similarly, the second container connector arrangement 28*b* comprises a second travelling beam 38*b* guided in second travelling beam guide configured as a sleeve 27*b* within the main frame 26. The travelling beams 38*a*, 38*b* are telescopically extendable between a retracted position (FIG. 4A) for connecting the spreader 24 to a 20-foot container, and an extended position (FIG. 4B) for connecting the spreader 24 to a 40-foot container. A proximal end 40*a* of the first travelling beam 38*a* is guided in the main frame 26 to be telescopically extendable from the main frame 26 in a first extension direction E1 along the longitudinal axis L, and a distal end 42*a* of the first travelling beam 38*a* is provided with a respective first transversal beam 44*a* extending in a transversal direction T substantially perpendicular to the longitudinal axis L. The first container connector arrangement 28*a* further comprises a first pair of lifting casting connectors configured as twist-locks 46*a* arranged at opposite ends of the first transversal beam 44*a*, which first pair of twist-locks 46*a* are connectable to the top face lock openings 18 (FIG. 2) of the top lifting castings 12*a* of the container's 10 first longitudinal end 14*a*.

Similarly, a proximal end 40*b* of the second travelling beam 38*b* is guided in the main frame 26 to be telescopically extendable from the main frame 26 in a second extension direction E2 opposite to the first extension direction along the longitudinal axis L, and a distal end 42*b* of the second travelling beam 38*b* is provided with a respective second transversal beam 44*b* extending along the transversal direction T. The second container connector arrangement 28*b* comprises a second pair of lifting casting connectors configured as twist-locks 46*b* arranged at opposite ends of the second transversal beam 44*b*, which second pair of twist-locks 46*b* are connectable to the top face lock openings 18 (FIG. 2) of the top lifting castings 12*b* of the container's 10 second longitudinal end 14*b*. For the sake of clarity, it is pointed out that FIG. 3 illustrates the spreader 24 with the travelling beams 38*a*, 38*b* in the retracted position, such that they are hid within the main frame 26.

Figure 5:
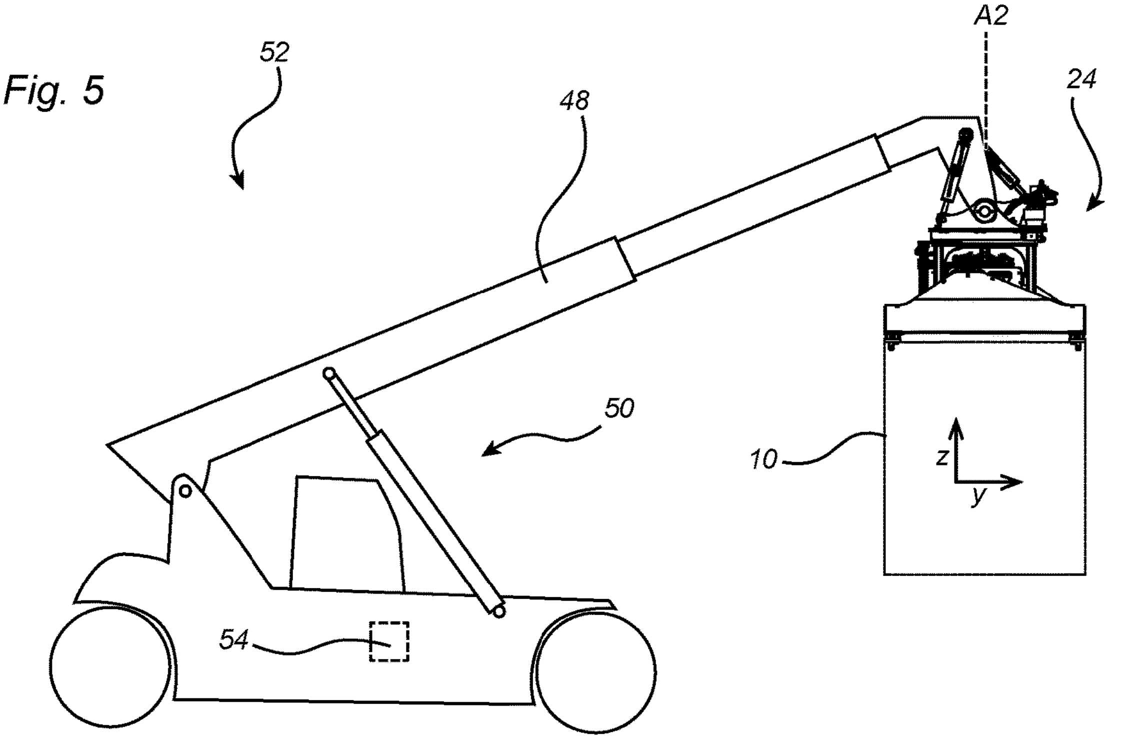
FIG. 5 is a side view of a reach stacker carrying the spreader of FIG. 3.

FIG. 5 illustrates the spreader 24 attached to a telescopic boom crane 48 of a truck 50, to form a reach stacker 52. FIG. 5 illustrates the reach stacker 52 with a container 10 attached to the spreader 24. The truck 50 is also provided with a control system 54, comprising electronics and/or computer program instructions for controlling the truck 50 as well as the crane 48 and the spreader 24.

Figure 6:
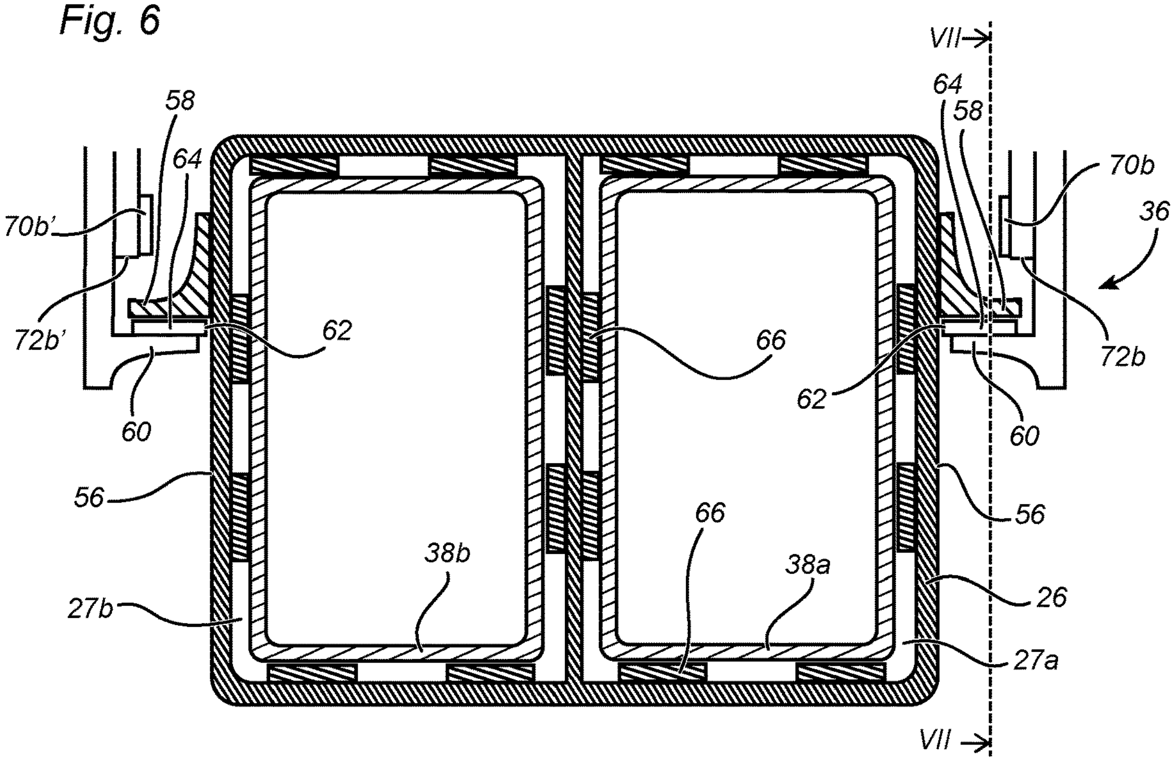
FIG. 6 illustrates a cross-section of a main frame and a main frame suspension arrangement of the spreader of FIG. 3, the cross-section being taken along the plane VI-VI of FIG. 3.

FIG. 6 highly schematically illustrates the main frame 26 and the main frame suspension arrangement 36 in a section along a section plane VI-VI (FIG. 3) perpendicular to the longitudinal axis L. The main frame comprises a pair of opposite outer side wall faces 56. A respective side-shift rail 58 is welded to the outer face of each side wall 56, the side-shift rails 58 protruding from the side walls 56 and extending along the longitudinal axis L (FIG. 3). Each side-shift rail 58 is vertically supported by and slidingly rests on a respective vertical support 60 of the main frame suspension arrangement 36, to allow sliding the main frame on the vertical supports 60 along said longitudinal axis L. The vertical supports 60 are provided with slide pads 64, which may be made of e.g. plastic such as polyurethane, for reducing the friction for sliding the main frame 26 along the main frame suspension arrangement 36. The slide pads 64 also define a pair of opposite side supports 62 facing the respective outer side wall faces 56, for guiding the main frame 26 along the longitudinal axis L. FIG. 6 also illustrates the travelling beams 38*a*, 38*b* within their respective travelling beam guides 27*a*, 27*b*. Friction-reducing slide pads 66 are arranged around the circumferences of the travelling beams 38*a*, 38*b*.

Figure 7A:
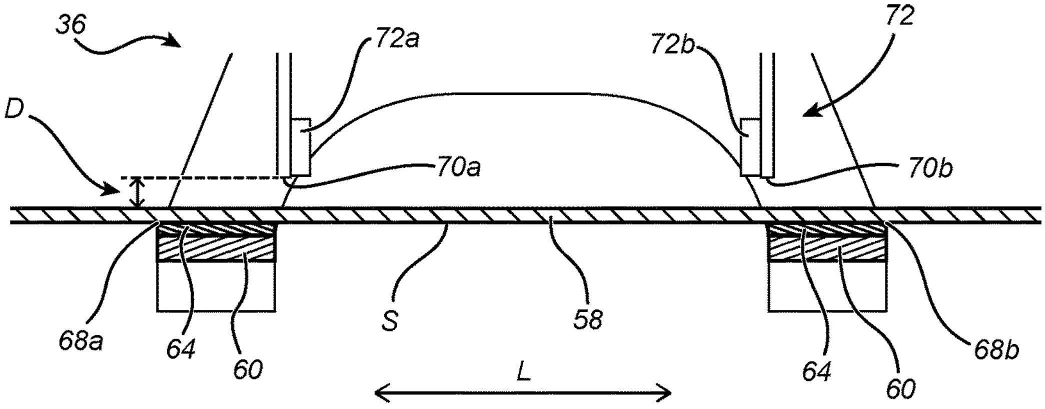
FIG. 7A illustrates a cross-section of the main frame suspension arrangement and a side-shift rail of the main frame of the spreader of FIG. 3 in relation to a detector arrangement according to a first embodiment, the cross-section being taken along the plane VII-VII of FIG. 6, wherein the main frame and the main frame suspension arrangement are in a first mutual relationship.

FIG. 7A illustrates a side-shift rail 58 and the main frame suspension arrangement 36 as seen in the section VII-VII of FIG. 6. The downwards-facing surface of the side-shift rail 58 movably rests upon the upwards-facing surfaces of the slide pads 64 along a support line S extending between a first support end 68*a* and a second support end 68*b*. The main frame suspension arrangement 36 further comprises, at a distance D1 above the side-shift rail 58, a first upper limit stop 70*a* and a second upper limit stop 70*b*, which provides an upper limit for the side-shift rail 58 in case it loses contact with the slide pads 64. This may occur in situations which will be elucidated in the following. Each of the upper limit stops 70*a*, 70*b* is also provided with a respective side-shift rail detector 72*a*, 72*b*, configured to detect the presence of the side-shift rail 58, and to communicate respective sensor signals to the control system 54 (FIG. 5). Similar upper limit stops 72*b*' and side-shift rail detectors 70*b*' may optionally be provided at the opposite side of the main frame 26. The side-shift rail detectors 72*a*, 72*b* form a simple detector arrangement 72 capable of detecting if a centre of mass of the suspension arrangement load is positioned beyond any of the support ends 68*a*, 68*b*.

Figure 7B:
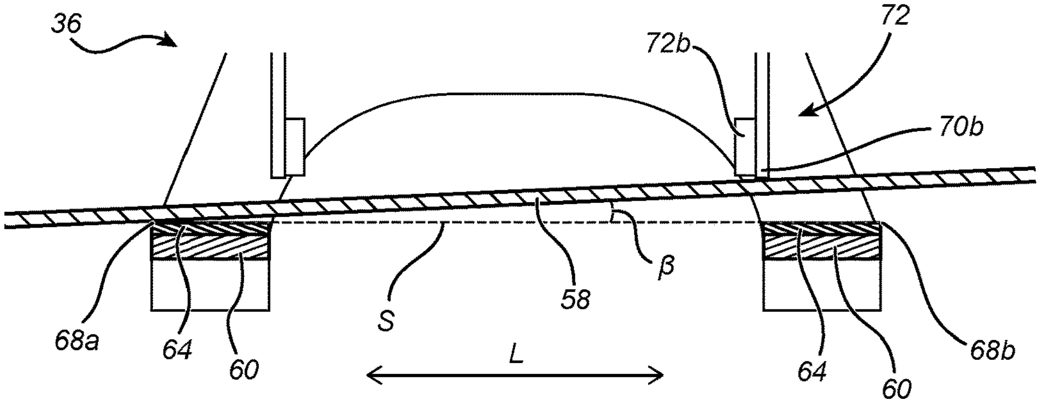
FIG. 7B corresponds to the view of FIG. 7A, wherein the main frame and the main frame suspension arrangement are in a second mutual relationship.

FIG. 7B illustrates a situation in which the centre of mass of the suspension arrangement load is positioned beyond the first support end 68*a*. In such a situation, the first support end 68*a* defines a fulcrum about which the suspension arrangement load, i.e. the main frame 26 (FIG. 3) together with any additional load carried by it, pivots. When the side-shift rail 58 reaches the second upper limit stop 70*b*, the presence of the side-shift rail 58 will be detected by the second side-shift rail detector 72*b*. The presence of the side-shift rail 58 at the second upper limit stop 70*b*, combined with non-presence of the side-shift rail 58 at the first upper limit stop 70*a*, indicates that the position of the suspension arrangement load's centre of mass is not between the first and second support ends 68*a*, 68*b*, but instead beyond the first support end 68*a*, as seen from a position between the support ends 68*a*, 68*b*.

In response to having detected the eccentric load situation of FIG. 7B, the control system 54 (FIG. 5) may impose a control constraint preventing e.g. side-shifting the main frame 26 (FIG. 3), thereby preventing friction wear between the second limit stop 70*b* and the upper face of the side-shift rail 58, and/or preventing further lifting of the container 10 (FIG. 5). The control system 54 may also be configured to operate a side-shift actuator to translate the main frame 26 relative to the main frame suspension arrangement 36 in a direction along the longitudinal axis L, to the right as seen in the view of FIG. 7B, thereby moving the longitudinal position of the suspension arrangement load's centre of gravity to a position between the support ends 68*a*, 68*b*. Still further, the control system 54 may be configured to brake or block a rotation of the main frame 26 via the rotator 34 (FIG. 3), and/or impose a control constraint limiting the possibility to tilt the rotator 34 about an axis parallel to the longitudinal axis L.

Figure 7C:
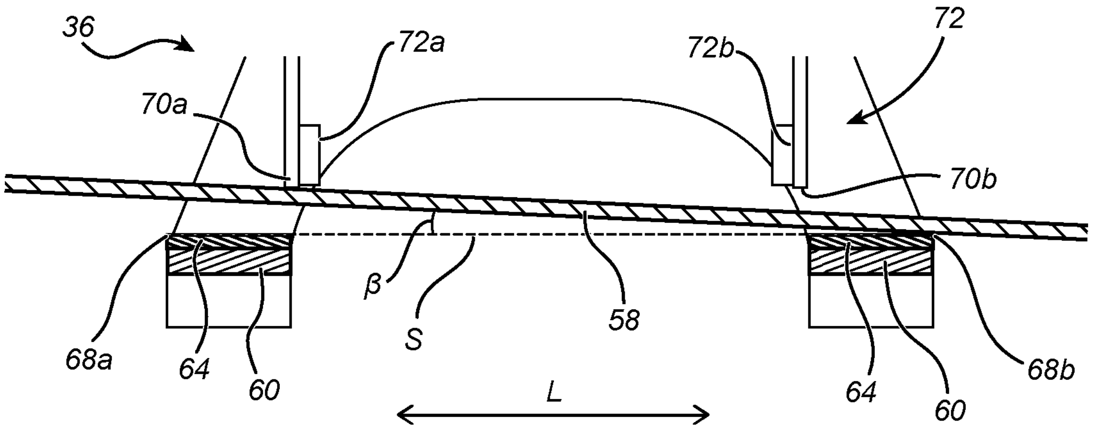
FIG. 7C corresponds to the view of FIG. 7A, wherein the main frame and the main frame suspension arrangement are in a third mutual relationship.

FIG. 7C illustrates a situation similar to that of FIG. 7B, though the centre of mass of the suspension arrangement load is instead positioned beyond the second support end 68*b*. In such a situation, the second support end 68*b* defines a fulcrum about which the suspension arrangement load pivots. When the side-shift rail 58 reaches the first upper limit stop 70*a*, the presence of the side-shift rail 58 will be detected by the first side-shift rail detector 72*a*. The presence of the side-shift rail 58 at the first upper limit stop 70*a*, combined with non-presence of the side-shift rail 58 at the second upper limit stop 70*b*, indicates that the position of the suspension arrangement load's centre of mass is beyond the second support end 68*b*, as seen from a position between the support ends 68*a*, 68*b*. The situation may be dealt with by the control system in a manner similar to that described with reference to FIG. 7B, mutatis mutandis.

As is apparent from FIGS. 7A-C, the detector arrangement comprising the side-shift rail detectors 72*a*, 72*b* is able to detect a change in the angle β formed between the main frame 26, in FIG. 7C represented by the side-shift rail 58, and the main frame suspension arrangement 36. The detector arrangement can also detect the direction of change of the angle R. The side-shift rail detectors 72*a*, 72*b* may also be configured to determine a shortest distance from the respective side-shift rail detector 72*a*, 72*b* to the side-shift rail 58, thereby enabling a determination of a magnitude of change of the angle R.

Figure 7D:
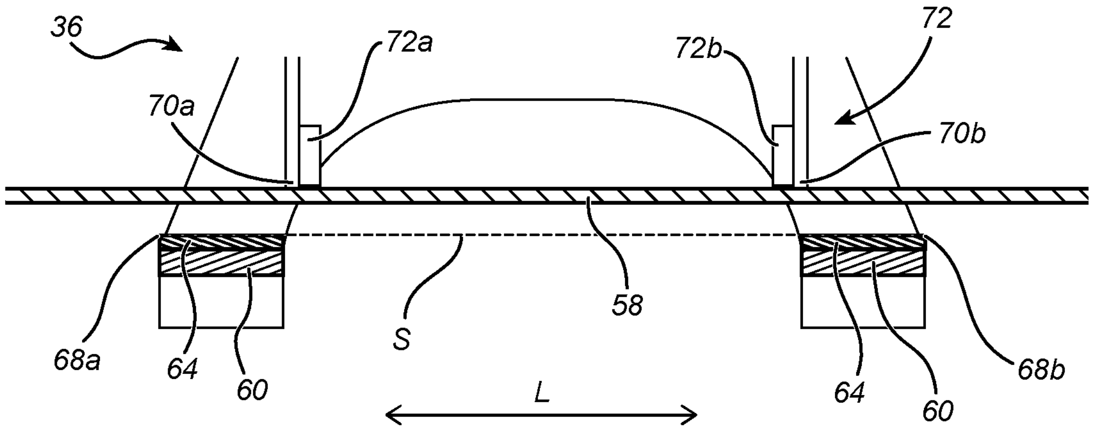
FIG. 7D corresponds to the view of FIG. 7A, wherein the main frame and the main frame suspension arrangement are in a fourth mutual relationship.

FIG. 7D illustrates a situation in which the side-shift rail 58 along its entire length has been raised above the support line S, indicating that the suspension arrangement load is no longer carried by the main frame suspension arrangement 36. The situation may be detected by both side-shift rail detectors 72*a*, 72*b* indicating to the control system 54 (FIG. 5) the presence of the side-shift rail 58. Such a situation may occur if the spreader is lowered until the main frame 26 rests upon a container 10, and the main frame suspension arrangement 36 is thereafter lowered even further. The control system 54 may respond to a detection of the illustrated situation by e.g. generating a signal to an operator or a control system to stop lowering the spreader 24, or to restrict the lowering speed.

Figure 8:
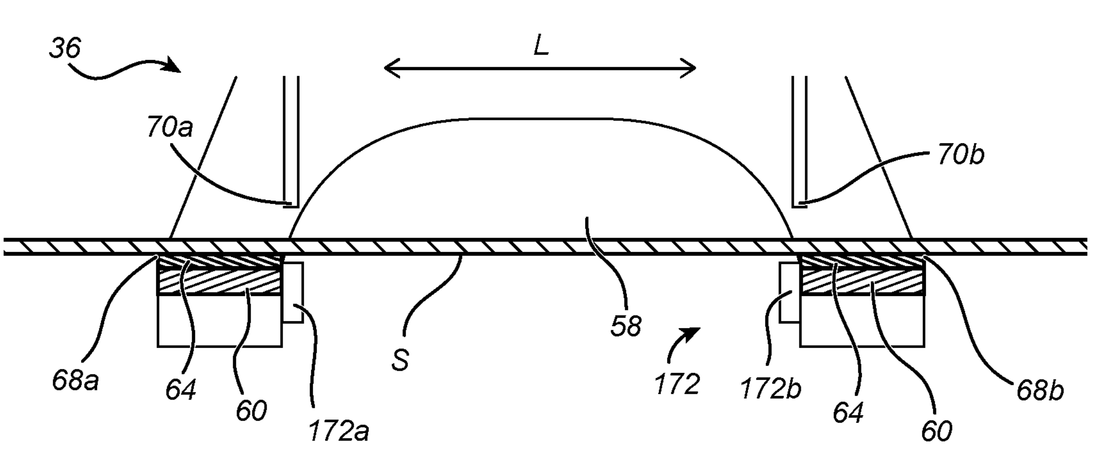
FIG. 8 illustrates a cross-section of the main frame suspension arrangement and a side-shift rail of the main frame of the spreader of FIG. 3 in relation to a detector arrangement according to a second embodiment, the cross-section corresponding to that taken along the plane VII-VII of FIG. 6, mutatis mutandis, wherein the main frame and the main frame suspension arrangement are in a mutual relationship corresponding to the first mutual relationship of FIG. 7A.

FIG. 8 illustrates a schematically illustrates a detector arrangement 172 according to a second embodiment. Similar to the detector arrangement 72 of FIGS. 7A-7D, the detector arrangement 172 of FIG. 8 comprises two side-shift rail detectors 172*a*, 172*b* arranged adjacent to the respective support ends 68*a*, 68*b* of the support line S and configured to detect the presence of the side-shift rail 58. However, the detector arrangement 172 of FIG. 8 differs from the detector arrangement 72 of FIGS. 7A-7D in that the detectors 172*a*, 172*b* are arranged below the side-shift rail 58. Thereby, the detector arrangement 172 would detect e.g. the situation illustrated in FIG. 7B not by detecting the presence of the side-shift rail 58 at the second side-shift rail detector 72*b* (FIG. 7B), but by detecting the absence of the side-shift rail 58 at the second side-shift rail detector 172*b*.

Figure 9:
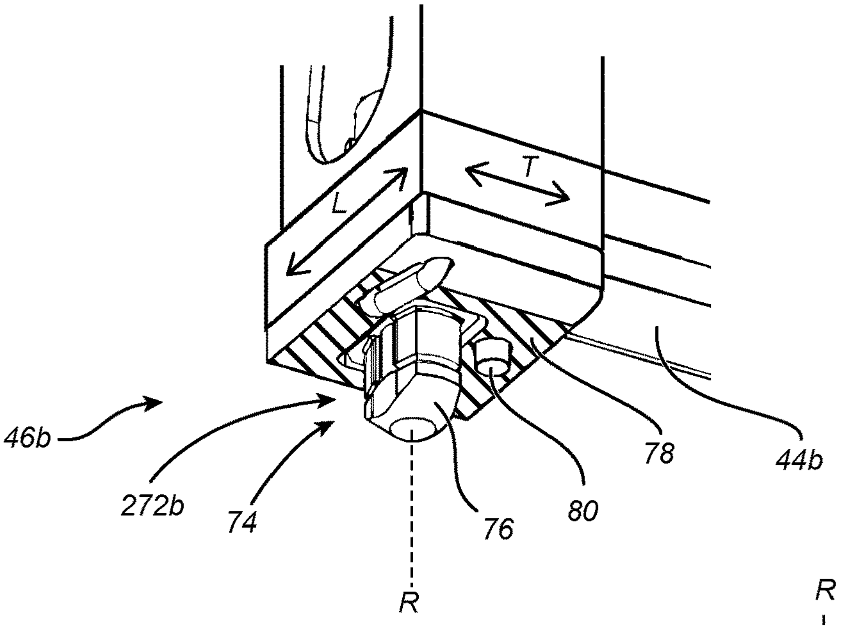
FIG. 9 is a perspective view, as seen obliquely from below, of a lifting casting connector of the spreader of FIG. 3.

FIG. 9 schematically illustrates a twist-lock 46*b* comprising a male locking insert 74 configured to be inserted into a top opening 18 (FIG. 2) of a respective container lifting casting 12*b* (FIG. 2). Once inside the lifting casting 12*b*, an end portion 76 of the male locking insert 74 is configured to be twisted 90° about a vertical axis R to a lock position, in which it engages with the lifting casting 12*b*. An abutment face 78 (hatched), flanking the male locking insert 74, corresponds to the size and shape of the top surface 19 (FIG. 2) of the lifting casting 12*b*, and is configured to rest thereupon once the spreader 24 (FIG. 3) has been lowered onto the container 10. A landing indicator has a vertically movable indicator body 80, a portion of which protrudes downwards from the abutment face 78. The landing indicator is configured to indicate when the upper surface 19 of the lifting casting 12*b* presses the indicator body 80 vertically into the abutment face 78 of the twist-lock 46*b*, and to notify the control system 54 (FIG. 5) of such an event.

Figure 10:
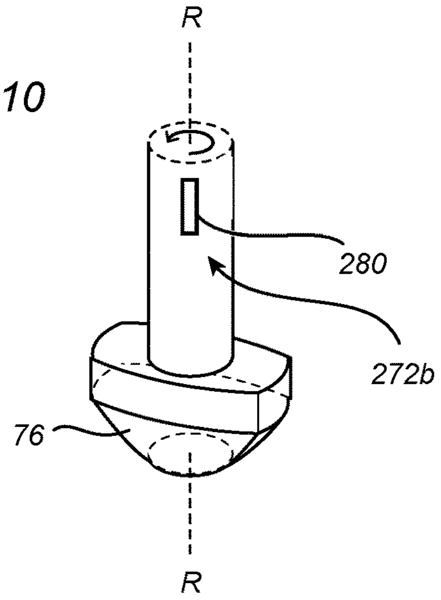
FIG. 10 is a perspective view, as seen obliquely from above, of a male locking insert of the lifting casting connector of FIG. 9.
Figure 11A:
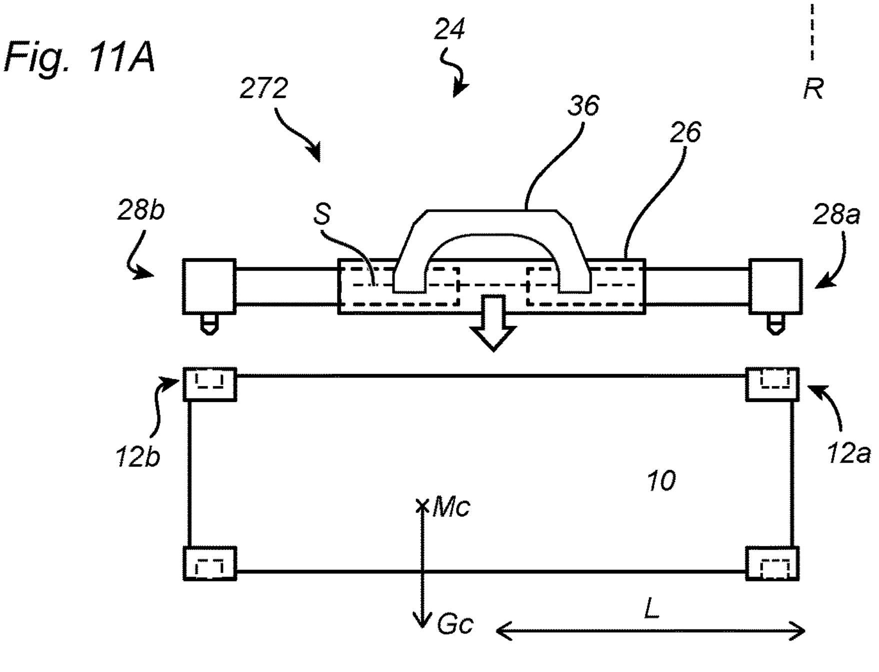
FIG. 11A is a side view illustrating the spreader of FIG. 3 and the container of FIG. 1 prior to connection.
Figure 11B:
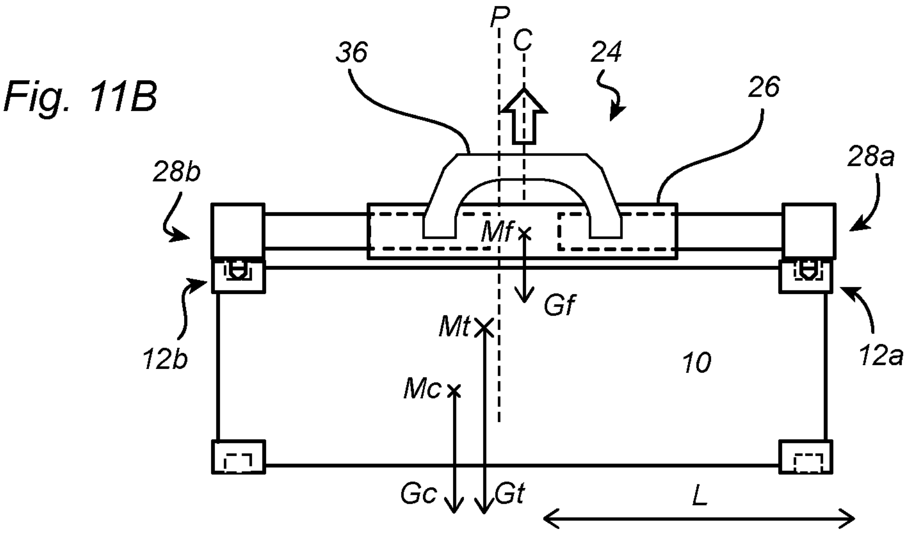
FIG. 11B corresponds to the view of FIG. 11A, illustrating the spreader and the container after connection, wherein the main frame and the main frame suspension arrangement of the spreader are in a first mutual relationship.
Figure 11C:
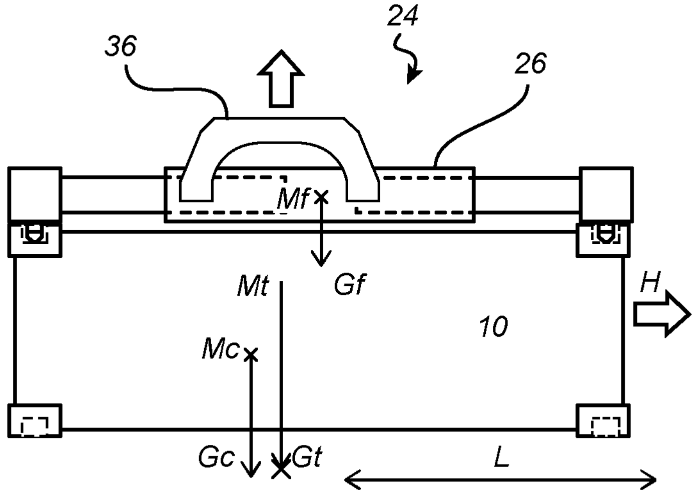
FIG. 11C corresponds to the view of FIG. 11B, wherein the main frame and the main frame suspension arrangement of the spreader are in a second mutual relationship.

The twist-lock 46*b* is further provided with a vertical load sensor 272*b* configured to measure the vertical load carried by the twist-lock 46*b*. FIG. 10 illustrates an example embodiment of the sensor 272*b*, according to which the vertical load sensor 272*b* (FIG. 9) is configured as a strain gauge 280 carried by the male locking insert 74. Similar vertical load sensors are provided on all four twist-locks 46*a*, 46*b* of the spreader 24 (FIG. 4A), such that the vertical load on each of the respective twist-locks 46*a*, 46*b* may be determined. Together with the longitudinal position of the main frame 26 relative to the main frame suspension arrangement 36, as determined by the side-shift sensor of the side-shift mechanism 37 (FIG. 3), the vertical load determined by the vertical load sensors 272*b* enables determining the position of the centre of mass of the suspension arrangement load. Such a determination may be made in a control system of the spreader 24 (FIG. 3) or any container handling equipment operating the spreader 24, such as the control system 54 (FIG. 5). Thereby, the side-shift sensor, the control system 54, and the vertical load sensors 272*b* together define, now with reference to FIG. 11A, a detector arrangement 272 configured to detect the position of the centre of mass of the suspension arrangement load along the support line S according to a third embodiment. In particular, the detector arrangement 272 enables determining whether the centre of mass is beyond a limit position along said support line S. FIGS. 11A-11C illustrate the operation of the detector arrangement 272 according to the third embodiment.

Starting with the situation of FIG. 11A, the spreader 24 is lowered onto a container 10 for connection thereto via container connector arrangements 28*a-b*.

In the situation of FIG. 11B, the spreader 24 has been connected to the container 10, and initiates a lift in the direction indicated by an arrow. The total vertical suspension arrangement load, carried by the main frame suspension arrangement 36, is the sum of the mass of the container 10, the main frame 26, and the container connector arrangements 28*a-b*. In the view of FIG. 11B, the centre of mass of the container is indicated by Mc, and the weight of the container 10, i.e. the gravitational force on the container 10, is indicated by arrow Gc. Similarly, the centre of mass of the main frame 26 and container connector arrangements 28*a-b* is indicated by Mf, and the weight of the main frame 26 and container connector arrangements 28*a-b* is indicated by arrow Gf. As is apparent from the position of the container's centre of mass Mc, the container weight Gc is eccentric relative to the container's 10 geometric centre along the longitudinal axis L. The total vertical load Gt on the main frame suspension arrangement 36, formed by the sum of the container, main frame, and container connector arrangement weights Gc, Gf, is also eccentric along the longitudinal axis L relative to the main frame suspension arrangement 36, and will generate a torque on the main frame suspension arrangement 36, which torque may have a negative impact on the handling of the container 10.

Based on the vertical loads determined by the respective vertical load sensors 272*b* (FIG. 9) of the container connector arrangements 28*a-b*, in combination with the side-shift position as determined by the side-shift mechanism 37 (FIG. 3), and a priori knowledge of the centre of mass Mf and weight Gf of the main frame 26 and container connector arrangements 28*a-b*, the longitudinal position relative to the main frame suspension arrangement 36 of the weight Gt and centre of mass Mt of the total suspension arrangement load may be determined, for example in the control system 54 (FIG. 5). The control system 54 may also make a determination that the centre of mass Mt is beyond a limit position P, and in response thereto, side-shift the main frame 26. The limit position P may be a longitudinal distance from the longitudinal centre C of the main frame suspension arrangement 36, which longitudinal distance may be set in the control system 54 (FIG. 5). Thereby, the embodiment described with reference to FIGS. 11A-11C differs from that described with reference to FIGS. 7A-D in that the limit position P may be freely set, and is not necessarily located to a support end 68*a-b* (FIG. 7A).

In the situation of FIG. 11C, the control system 54 has operated, based on the longitudinal position of the total suspension arrangement load Gt determined in the situation of FIG. 11B, the side-shift mechanism 37 (FIG. 3) to move the main frame 26 in the direction of the horizontal arrow H along the longitudinal axis L to the illustrated position, in which the suspension arrangement load Gt is now centred below the main frame suspension arrangement 36.

Figure 12:
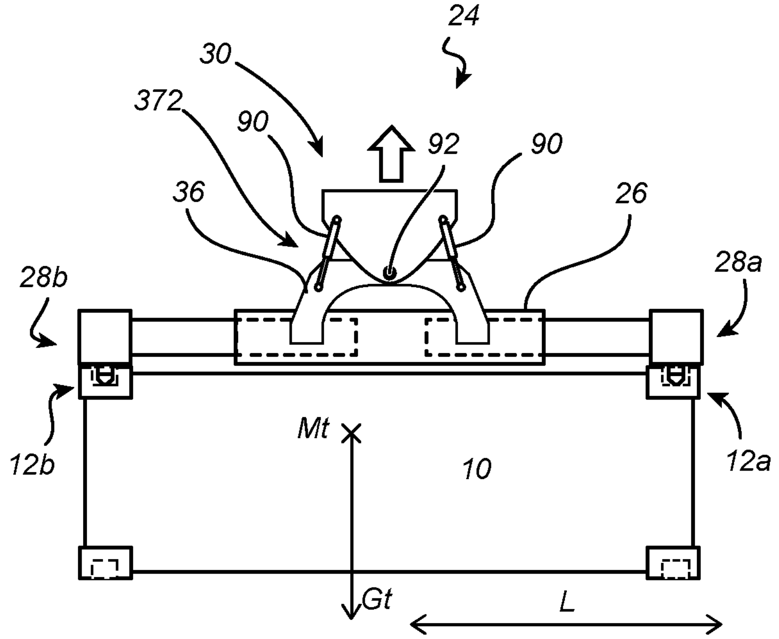
FIG. 12 is a side view illustrating another embodiment of a spreader connected to the container of FIG. 1.

FIG. 12 illustrates an embodiment of a spreader 24 provided with powered pile slope actuators 90, which actuators 90 are configured as hydraulic cylinders. The powered pile slope actuators 90 are controlled by the control system 54, and enable sideways leaning of the container 10 about a pivot 92. A difference in hydraulic pressure between the powered pile slope actuators 90, when the container is held horizontally, indicates an eccentric suspension arrangement load Gt, which indication may be used in accordance with the teachings herein. Hence, the powered pile slope actuators 90 may form part of a detector arrangement 372 configured to detect if the centre of mass Mt of the suspension arrangement load is positioned at a longitudinal position which is beyond a limit position. A single, double-acting hydraulic cylinder would enable the same functionality as the two actuators 90 of FIG. 12.

Figure 13:
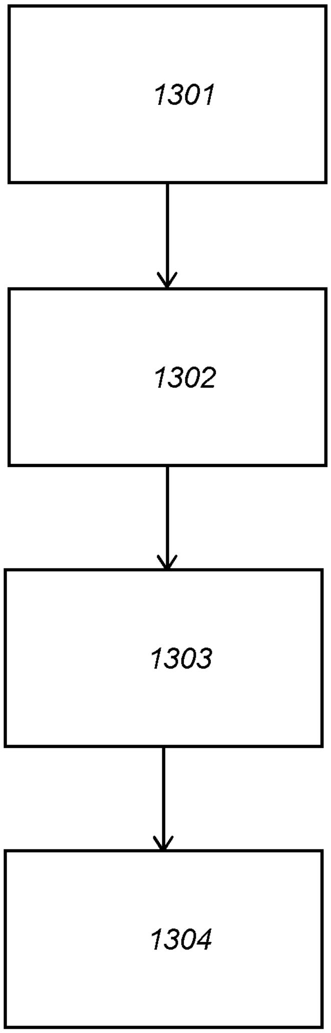
FIG. 13 is a flow chart illustrating a method of lifting a container according to a first embodiment.

The flow chart of FIG. 13 illustrates a method of lifting a container using a spreader 24 described hereinabove, the method enabling the detection of potentially dangerous situations posed by an eccentric load. The method comprises the steps

- 1301: positioning the main frame 26 at a longitudinal position along the main frame suspension arrangement 36;
- 1302: attaching the container connector arrangements 28*a*, 28*b* of the spreader at two longitudinal ends 14*a*, 14*b* of the container 10;
- 1303: initiating a lift of the container 10 by lifting the spreader 24; and
- 1304: detecting whether a longitudinal position of a centre of mass of a load Gt carried by the main frame suspension arrangement 36 is beyond a limit position.

Figure 14:
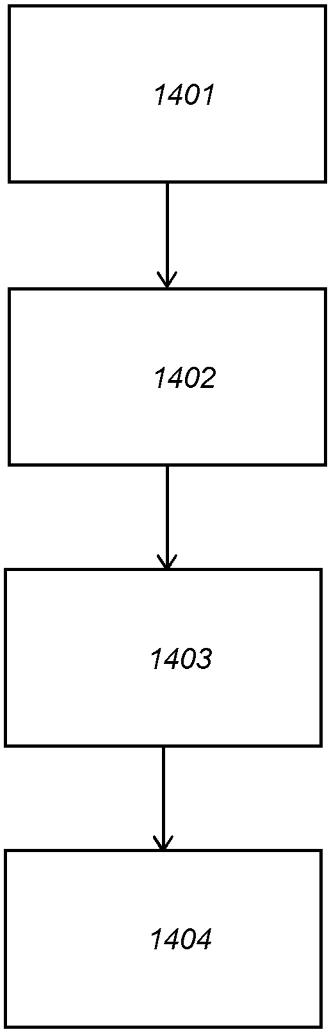
FIG. 14 is a flow chart illustrating a method of lifting a container according to a second embodiment.

The flow chart of FIG. 14 illustrates a second method of lifting a container using a spreader 24 described hereinabove, the method mitigating any potentially dangerous consequences of eccentrically loaded transport containers. The method comprises the steps

- 1401: attaching container connector arrangements 28*a*, 28*b*, carried by the main frame 26, at two longitudinal ends 14*a*, 14*b* of the container 10;
- 1402: initiating a lift of the container 10 by lifting the spreader 24;
- 1403: detecting a longitudinal eccentricity of a centre of mass Mc of the container 10; and

1404: based on the detected eccentricity, moving the centre of mass Mc of the container 10 sideways, towards a longitudinal centre of the main frame suspension arrangement 36, by moving the main frame 26 sideways.

Figure 15:
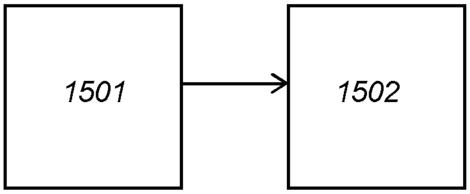
FIG. 15 is a flow chart illustrating a method of lifting a container according to a third embodiment.

The flow chart of FIG. 15 illustrates a third method of lifting a container using a spreader 24 described hereinabove, the method enabling detecting when the spreader 24 has landed on the container 10. The method comprises the steps

1501: lowering the spreader onto the container 10; and

1502: detecting a vertical displacement of the main frame 26 relative to the main frame suspension arrangement 36 at least at two longitudinally separated positions.

The invention has mainly been described above with reference to a few embodiments. However, as is readily appreciated by a person skilled in the art, other embodiments than the ones disclosed above are equally possible within the scope of the invention, as defined by the appended patent claims. By way of example, the invention is applicable to spreaders configured to engage with, and lift, other containers than standardized intermodal transport containers. Container connector arrangements may be of types different from twist-locks, such as lifting hooks and grapple arms. Even though the invention has been described with reference to top-lift spreaders, the teachings herein are also applicable to side-lift spreaders configured to engage with only a single longitudinal side of a transport container.

In the claims, the word "comprising" does not exclude other elements or steps, and the indefinite article "a" or "an" does not exclude a plurality.

The invention claimed is:

1. A spreader for lifting a transport container, the spreader comprising a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container; and a main frame suspension arrangement, wherein the main frame is translatably suspended in said main frame suspension arrangement to enable translation along said longitudinal axis, wherein the main frame is configured to be vertically supported by the main frame suspension arrangement along a support line extending between a first support end and a second support end, the main frame suspension arrangement carrying the weight of a suspension arrangement load comprising the main frame, the container connector arrangements, and any container attached to the container connector arrangements; and a detector arrangement configured to detect if a centre of mass of the suspension arrangement load is positioned at a longitudinal position along the support line which is beyond a limit position;

wherein the detector arrangement is configured to detect if the centre of mass of the suspension arrangement load is positioned at a longitudinal position along the support line which is beyond a limit position based on a displacement of at least a portion of the main frame in relation to the main frame suspension arrangement.

2. The spreader according to claim 1, wherein a support end is said limit position.

3. The spreader according to claim 2, wherein the detector arrangement is configured to detect if said centre of mass is positioned at a longitudinal position beyond any of said support ends.

4. The spreader according to claim 3, wherein the detector arrangement is configured to determine whether said centre of mass is positioned beyond said first support end or beyond said second support end.

5. The spreader according to claim 1, wherein the detector arrangement is configured to detect a change in an angle formed between the main frame and the main frame suspension arrangement.

6. The spreader according to claim 1, wherein the detector arrangement is configured to detect that said centre of mass is beyond the second support end based on a vertical displacement of the main frame relative to the main frame suspension arrangement at the first support end.

7. The spreader according to claim 6, wherein the detector arrangement comprises a first sensor adjacent to the first support end, the first sensor being configured to detect said vertical displacement of the main frame relative to the main frame suspension arrangement at the first support end.

8. The spreader according to claim 6, wherein the detector arrangement comprises a first sensor adjacent to the first support end, the first sensor being configured to detect said vertical displacement of the main frame relative to the main frame suspension arrangement at the first support end, and to detect that said center of mass is beyond the first support end based on a vertical displacement of the main frame relative to the main frame suspension arrangement at the second support end, and the detector arrangement further comprises a second sensor adjacent to the second support end, the second sensor being configured to detect said vertical displacement of the main frame relative to the main frame suspension arrangement at the second support end.

9. The spreader according to claim 1, wherein the detector arrangement is configured to detect that said centre of mass is beyond the first support end based on a vertical displacement of the main frame relative to the main frame suspension arrangement at the second support end.

10. The spreader according to claim 1, wherein the detector arrangement is configured to detect a vertical displacement of the main frame relative to the main frame suspension arrangement at least at two longitudinally separated positions.

11. The spreader according to claim 1, wherein the main frame suspension arrangement is configured to permit a vertical play of the main frame, at the first support end and the second support end, of less than 300 mm.

12. The spreader according to claim 1, wherein a downwards-facing surface of the main frame slidably rests on an upwards-facing surface of the main frame suspension arrangement to enable a longitudinal translation between the main frame and the main frame suspension arrangement.

13. The spreader according to claim 1, wherein the main frame comprises a pair of opposite outer side wall faces, each outer side wall face provided with a respective side-shift rail protruding therefrom and extending along said longitudinal axis, each side-shift rail resting on a respective vertical support of said main frame suspension arrangement so as to allow moving the main frame on said vertical supports along said longitudinal axis.

14. The spreader according to claim 1, wherein the support line is defined by a slide pad arrangement comprising at least one slide pad.

15. The spreader according to claim 1, wherein the first container connector arrangement comprises a first travelling beam, and the second container connector arrangement comprises a second travelling beam, wherein a proximal end of the first travelling beam is guided in the main frame to be telescopically extendable from the main frame in a first direction along said longitudinal axis, and a distal end of the first travelling beam is configured to engage with a first end of said transport container, and wherein a proximal end of the second travelling beam is guided in the main frame to be telescopically extendable from the main frame in a second direction along said longitudinal axis, and a distal end of the second travelling beam is configured to engage with a second end of said transport container.

16. The spreader according to claim 1, wherein each of said first and second container connector arrangements comprises a respective transversal beam extending in a direction transversal to the longitudinal axis, each of said transversal beams being provided with two respective lifting casting connectors separated along said transversal direction, for connecting to two lifting castings of said transport container.

17. The spreader according to claim 1, wherein the detector arrangement is configured to generate, based on said detection, an electronic indication signal to a control system or an operator of the spreader.

18. The spreader according to claim 1, wherein the detector arrangement comprises at least one actuator for powered pile slope, wherein the detection is based on a detected load on said at least one actuator.

19. The spreader according to claim 1, further comprising a crane connection interface comprising a crane bracket, the crane connection interface enabling the spreader to be rigidly connected to a crane arm or boom of e.g. a vehicle.

20. A container handling equipment comprising a spreader according to claim 1, the container handling equipment comprising a control system configured to, based on said detection, impose a control constraint limiting a set of permissible operations of the container handling equipment.

21. The container handling equipment according to claim 20, wherein the spreader comprises a rotator configured to rotate the main frame about a substantially vertical rotation axis perpendicular to the longitudinal axis, wherein said control system is configured to, based on a detected position of said centre of mass, brake or block a rotation of the main frame via said rotator, and/or impose a control constraint limiting a possibility to tilt the rotator about an axis parallel to the longitudinal axis.

22. A method of lifting a transport container using a spreader rigidly connected to a crane arm or boom, the method comprising:

positioning a main frame at a longitudinal position along a main frame suspension arrangement;

attaching container connector arrangements of the spreader at two longitudinal ends of said container;

initiating a lift of said container by lifting said spreader; and detecting whether a longitudinal position of a centre of mass of a load carried by the main frame suspension arrangement is beyond a limit position.

23. The method of claim 22, comprising:

detecting a longitudinal eccentricity of a centre of mass of the container; and based on the detected eccentricity, moving the centre of mass of the container sideways, towards a longitudinal centre of the main frame suspension arrangement, by moving the main frame sideways.

* * * * *